(12) United States Patent
McFadyen

(10) Patent No.: US 10,088,280 B2
(45) Date of Patent: Oct. 2, 2018

(54) CONTROL MODULE FOR AUTONOMOUS TARGET SYSTEM

(71) Applicant: Norma Zell, Fall River Mills, CA (US)

(72) Inventor: Michael D. McFadyen, Fairfield, ID (US)

(73) Assignee: Norma Zell, Fall River Mills, CA (US)

( * ) Notice: Subject to any disclaimer, the term of this patent is extended or adjusted under 35 U.S.C. 154(b) by 447 days.

(21) Appl. No.: 14/948,270

(22) Filed: Nov. 21, 2015

(65) Prior Publication Data
US 2017/0146324 A1  May 25, 2017

(51) Int. Cl.
*F41J 7/06* (2006.01)
*F41J 5/18* (2006.01)
*G09B 9/00* (2006.01)

(52) U.S. Cl.
CPC . *F41J 7/06* (2013.01); *F41J 5/18* (2013.01); *G09B 9/003* (2013.01)

(58) Field of Classification Search
None
See application file for complete search history.

(56) References Cited

U.S. PATENT DOCUMENTS

| | | | | |
|---|---|---|---|---|
| 4,540,182 A | * | 9/1985 | Clement | F41J 7/04 273/391 |
| 5,213,336 A | * | 5/1993 | Bateman | F41J 7/06 273/406 |
| 5,320,358 A | | 6/1994 | Jones | |
| 5,409,238 A | * | 4/1995 | Norris | F16D 9/06 273/392 |
| 5,433,451 A | * | 7/1995 | De Vries | 273/392 |
| 5,603,505 A | | 2/1997 | Acock | |
| 5,823,779 A | | 10/1998 | Muchle | |
| 6,257,583 B1 | | 6/2001 | Roberson | |
| 7,694,973 B1 | | 4/2010 | Hofmeister | |
| 7,735,832 B2 | | 6/2010 | Bliehall | |
| 8,057,233 B2 | | 11/2011 | Owen | |
| 2003/0091960 A1 | * | 5/2003 | Rosa | F41G 3/2655 434/21 |
| 2005/0153262 A1 | * | 7/2005 | Kendir | F41G 3/2655 434/21 |
| 2007/0135218 A1 | * | 6/2007 | Williams | A63G 25/00 463/49 |
| 2010/0225062 A1 | * | 9/2010 | Shum | F41J 7/06 273/359 |

(Continued)

*Primary Examiner* — Robert T Clarke, Jr.
(74) *Attorney, Agent, or Firm* — Sean D. Burdick

(57) ABSTRACT

A portable control module autonomously positions a target deployed in a combat simulation course. The module chassis is bullet-resistant and angled to deflect errant shots, and encloses a control circuit having an adjustable target exposure delay, an adjustable target exposure duration, means for receiving a trigger signal representing movement of a human body, means for revealing the target when the exposure delay lapses after triggering, means for enabling, only when the target is revealed, hit detection means detecting a shot striking the target, and means for concealing the target responsive to earliest occurrence of the shot detection or lapse of the target exposure duration. The module may include means for relaying the trigger signal to other modules within a cooperative decentralized target control system. A method for the autonomous position control is also disclosed.

17 Claims, 10 Drawing Sheets

(56) References Cited

U.S. PATENT DOCUMENTS

| | | | | |
|---|---|---|---|---|
| 2011/0175293 A1* | 7/2011 | Brune | ............................ | F41J 1/10 |
| | | | | 273/406 |
| 2013/0147117 A1* | 6/2013 | Graham | ...................... | F41J 7/04 |
| | | | | 273/393 |
| 2016/0209185 A1* | 7/2016 | Ford | ............................ | F41J 9/02 |
| 2016/0327378 A1* | 11/2016 | Davis | .......................... | F41J 5/205 |
| 2017/0316711 A1* | 11/2017 | Surdu | ...................... | G09B 9/003 |
| 2018/0045495 A1* | 2/2018 | Harris | ........................ | F41J 7/06 |

* cited by examiner

CONTROL MODULE FOR AUTONOMOUS TARGET SYSTEM

BACKGROUND OF THE INVENTION

Field of the Invention

The present invention relates generally to target shooting control systems, to a system and method for controlling multiple autonomous targets, and more specifically to a control module for an autonomous target system which automatically deploys a target responsive to movement of a shooter and automatically conceals a target responsive to hit detection.

Description of Related Art

Target shooting control systems have applications, for example, in the design of pinball machines, shooting galleries, and live firing ranges. Such targeting systems provide dynamic control for positioning one or more targets to reveal or conceal the targets with respect to a shooter's field of view. A common type of target is a pop-up target, which can be toggled by a controller between the "up" or revealed position and the "down" or concealed position. The shooter, whether playing a game or training for live combat, is challenged by the target control system's deployment of different targets during a shooting exercise, by which it causes targets to pop up or down according to a predetermined sequence, in response to the shooter's location, or in response to the shooter successfully striking a target.

Movable targets are often designed to resemble a bull's eye, a game animal, or a silhouette or other image of a human torso. Mechanisms for deploying such targets are well known. One exemplary mechanism for a pop-up target comprises a central target pivotally attached to a frame to which one or more additional targets are attached in such a way that a direct hit to the central target causes it to fall backward and trip springs that reveal additional targets that were previously concealed. Another mechanism known in the art consists of a target rotationally connected to a base for pendular movement, and a balloon hidden from the shooter's view behind the target. Through a linkage, the lift of the balloon maintains a hinge in a locked position to maintain the target in an upright position. When a direct hit passes through the target and deflates the balloon, the hinge unlocks causing the target to fall over. Other, more elaborate movable targets are operated by electro-mechanical assemblies that employ motors to rotate a target between its concealed and revealed positions. Limit switches installed in the path of a rotating part of the assembly change state to turn off motor power when a desired degree of rotation has been achieved. Switching motor power polarity allows the target to cycle between the concealed and revealed positions. Other motorized systems use a spring force for rapid deployment of the target into the revealed position, so that the motor need only rotate in one direction to conceal the target and recharge the spring. Still other systems use servo motors to move targets along a track or continuously along a conveyor. It is known to employ manual, automatic, or wireless control to cycle the targets in the foregoing systems.

A growing area of interest in the field of target shooting control systems is in applications for training police and military forces in simulated live-fire conditions. Some advancements have been made in the design of combat simulation systems for both indoor and outdoor settings. One system adaptable for indoor use projects a video image of a combat scene onto a display screen at one end of a weapon range. Impact sensors on the screen detect simulated or actual fire from a shooter. Obstructions placed in the weapon range provide cover for the shooter, while return fire simulators fire non-lethal shots back at the shooter, whose position within the range is detectable using video camera feedback. A microprocessor linked to all components runs a program to read data from the impact sensors, and to control the projector, sound, cameras, and return fire simulators. Another system adapted for indoor or outdoor use deploys programmable pop-up targets along a game course. Each target is equipped with a gun for returning fire at a shooter and a hit detector for detecting a hit on the target. Each target is associated with a proximity sensor that senses the position of the shooter as the shooter traverses the course. A main controller linked to all of these components runs a program responsive to a skill level selected for the shooter. The program determines the exposure time of each target after its associated proximity sensor trips, and whether and how often each gun returns fire.

The aforementioned simulation systems are overly complex and failure prone. In particular, the use of centralized controllers linked to multiple field components limits the operator's freedom to rearrange, relocate, or expand the target system over wide and varying terrain. Microelectronic components may break down in the field, especially when exposed to harsh conditions and gunfire, and the use of centralized control notoriously renders the system susceptible to single mode failure. What is needed is a portable decentralized target control system of rugged construction that provides the system operator with the ability to easily arrange and modify a shooting course over a wide range of indoor and outdoor topography to simulate any urban warfare or combat scenario.

SUMMARY OF THE INVENTION

The present invention discloses a control module for an autonomous target control system for combat simulation or law enforcement training. The module is adapted for use with pop-up targets configured for remote or local activation. The module is bullet-resistant and designed for deployment in harsh outdoor terrain. A system or method according to the invention automatically deploys targets responsive to triggering signals and automatically conceals targets responsive to hit detection signals. The system may employ centralized or decentralized target control, and can be scaled for controlling any number of targets deployed in a firing range or any other location.

According to the invention, a method for autonomous position control of a target deployed in a combat simulation course comprises the following salient steps, which may be performed by a control module mechanically linked to actuate the target. The method comprises providing an adjustable target exposure delay, providing an adjustable target exposure duration, and receiving from a motion sensor a trigger signal representing movement of a human body within a predetermined distance from the target. The method further comprises revealing the target when the target exposure delay lapses responsive to receiving the trigger signal, enabling—only when the target is revealed—a hit detection sensor to transmit a hit detection signal responsive to a shot striking the target, and concealing the target responsive to earliest occurrence of receiving the hit detection signal or lapse of the target exposure duration after revealing the target.

More elaborate methods according to the invention are also disclosed. One or both of the adjustable target exposure delay and the adjustable target exposure duration may be locally manually adjustable. The target may comprise one target within a decentralized, cooperative system of targets deployed in the combat simulation course, and the method may further comprising relaying the trigger signal to one or more other targets within the cooperative system. Within the cooperative system, the method may further comprise relaying the trigger signal after a predetermined time delay, or the method may further comprise relaying the trigger signal only when the target is revealed. In another embodiment, a method of the invention may further comprise distinguishing, by the motion sensor, detonation of a stun grenade from the movement of a human body, so that the detonation alone averts the trigger signal. A method of the invention may further comprise concealing the target upon receiving a near-miss detection signal and revealing the target at a predetermined time after receiving the near-miss detection signal.

The invention further discloses a target control module configured to autonomously position a target deployed in a combat simulation course. The target control modules includes means for providing an adjustable target exposure delay, means for providing an adjustable target exposure duration, and means for receiving from a motion sensor a trigger signal representing movement of a human body within a predetermined distance from the target. The target control module further includes means for revealing the target when the target exposure delay lapses responsive to receiving the trigger signal, means for enabling—only when the target is revealed—a hit detection circuit to transmit a hit detection signal responsive to a shot striking the target, and means for concealing the target responsive to earliest occurrence of the target control module receiving the hit detection signal or lapse of the target exposure duration after the target control module reveals the target.

In more elaborate embodiments of a target control module according to the invention, one or both of the means for providing the adjustable target exposure delay and the means for providing the adjustable target exposure duration comprise local manually adjustable means. The target control module may further comprise means for relaying the trigger signal to one or more other target control modules within a cooperative system of target control modules deployed in the combat simulation course. In another embodiment, the target control module includes means for relaying the trigger signal after a predetermined time delay. The target control module may further include means for relaying the trigger signal only when the target is revealed. In another embodiment, the target control module includes means for concealing the target upon receiving a near-miss signal and means for revealing the target at a predetermined time after the near-miss signal is received. The target control module may also include a means for deflecting a shot toward ground.

The invention further discloses a system of autonomously positionable targets deployed in a combat simulation course. The system includes at least one target control module mechanically linked to one of the targets, wherein the target control module comprises an adjustable delay timer defining a target exposure delay, an adjustable duration timer defining a target exposure duration, and a triggering input configured to receive a trigger signal representing movement of a human body within a predetermined distance from the target. The target control module further includes a hit detection circuit configured to enable—only when the target is revealed—a hit detection sensor to transmit a hit detection signal responsive to a shot striking the target, and one or more rotatable arms engaging the target and configured to reveal the target when the target exposure delay lapses responsive to receiving the trigger signal and to conceal the target responsive to earliest occurrence of receiving the hit detection signal or lapse of the target exposure duration after revealing the target. The target control module further includes at least one motion sensor coupled to the triggering input, and means for linking the triggering input to another target control module.

In more elaborate embodiments of a system of autonomously positionable targets according to the invention, one or both of the adjustable delay timer and the adjustable duration timer comprise local manually adjustable timers. In another embodiment of the system, the linking means comprises a relay configured to transmit the trigger signal to another target control module after a predetermined time delay only when the target is revealed. The system may also include rotating arms for engaging the target that are configured to conceal the target upon the target control module receiving a near-miss signal and to reveal the target at a predetermined time after the near-miss signal is received. In another embodiment of the system, at least one of the target control modules comprises a bullet-proof chassis enclosing the adjustable delay timer and the adjustable duration timer, wherein the chassis includes at least one side angled to deflect a shot toward ground. The chassis may further include an angled shield adjacent to the one or more rotatable arms that is configured to deflect a shot toward ground.

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. Component parts shown in the drawings are not necessarily to scale, and may be exaggerated to better illustrate the important features of the invention. Dimensions shown are exemplary only. In the drawings, like reference numerals may designate like parts throughout the different views, wherein:

DETAILED DESCRIPTION OF THE INVENTION

The following disclosure presents exemplary embodiments for a control module for an autonomous target control system suitable for training military or law enforcement personnel. The module is adapted for use with pop-up targets configured for remote or local activation. The module may be bullet-resistant and designed for deployment in harsh outdoor terrain. A system or method according to the invention automatically deploys targets responsive to triggering signals and automatically conceals targets responsive to hit detection signals. The system may employ centralized or decentralized target control, and can be scaled for controlling any number of targets deployed in a firing range or any other location.

Figure 1:
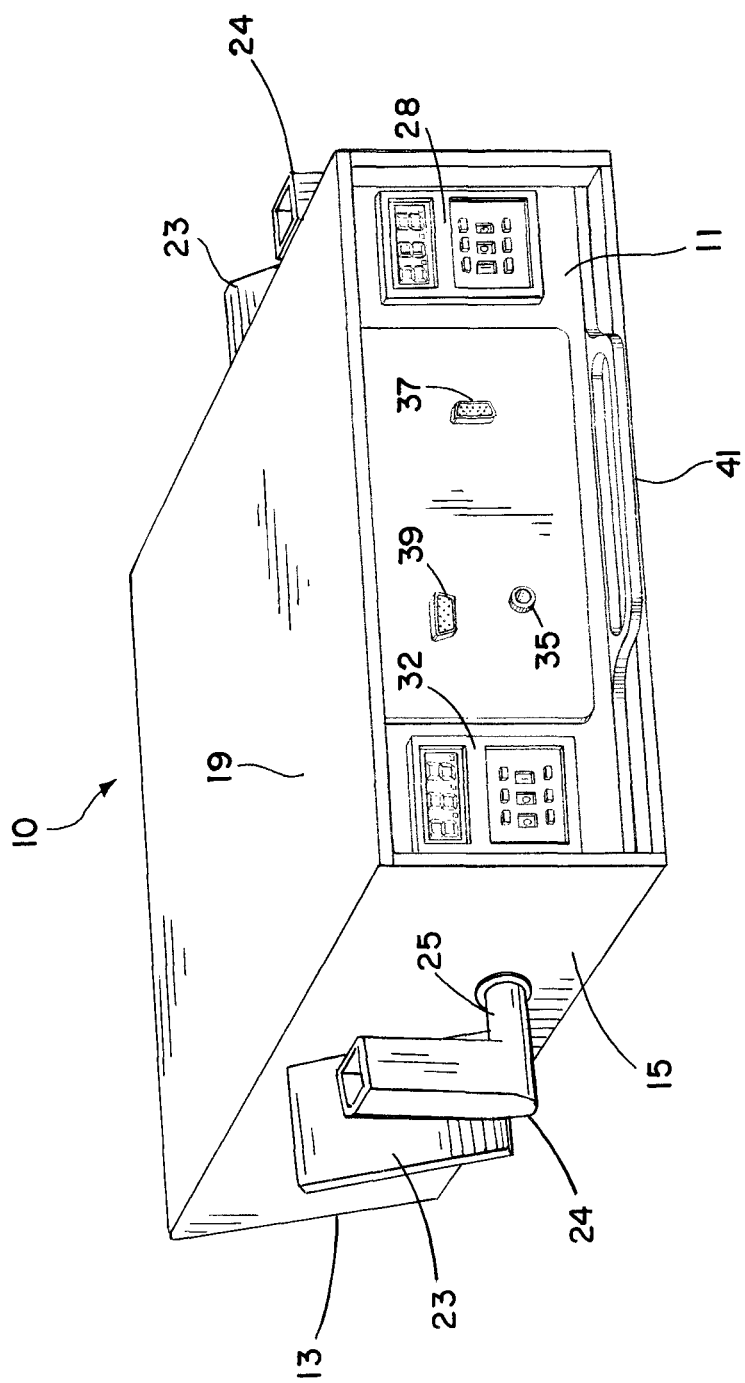
FIG. 1 is a rear perspective view of one embodiment of a control module for an autonomous target system according to the present invention.

FIG. 1 shows a rear perspective view of one embodiment of a control module 10 for an autonomous target system according to the present invention. The rear view is provided to better illustrate control features and electrical connections. The chassis of control module 10 comprises an enclosure that houses electrical components of the module and provides external ports for these components on the rear panel 11. Their location on the rear panel 11 protect the ports and connecting cables from frontal fire. The chassis outer surface further consists of front panel 13, right side panel 15, left side panel 17, top panel 19, and bottom panel 21. The chassis provides mounting locations for the various components of control module 10, including side shields 23, target arms 24, delay timer 28, exposure timer 32, external power port 35, main connector 37 and link connector 39. Rubber feet 22 are installed near each corner of bottom panel 21 for stability and shock absorption. A rear handle 41 is also mounted to the rear panel 11 to allow the control module to be easily ported by hand.

The chassis is preferably constructed from bullet-resistant material, such as AR450 plate steel. In one embodiment, the panels of the chassis of control module 10 have a uniform thickness of ¼ inch for all panels—front, rear, top, bottom and sides. In another embodiment, the front panel 13 may have a thickness greater than the other panels, such as ⅜ inches or greater, to enable the module to withstand a direct hit from large caliber firearms such as a 30 caliber rifle or 9 mm handgun. In other embodiments that are designed for lighter duty, for example, air-soft applications, the chassis of control module 10 may be constructed from softer material, such as aluminum, hard plastic, or a lower grade of carbon steel.

Figure 3:
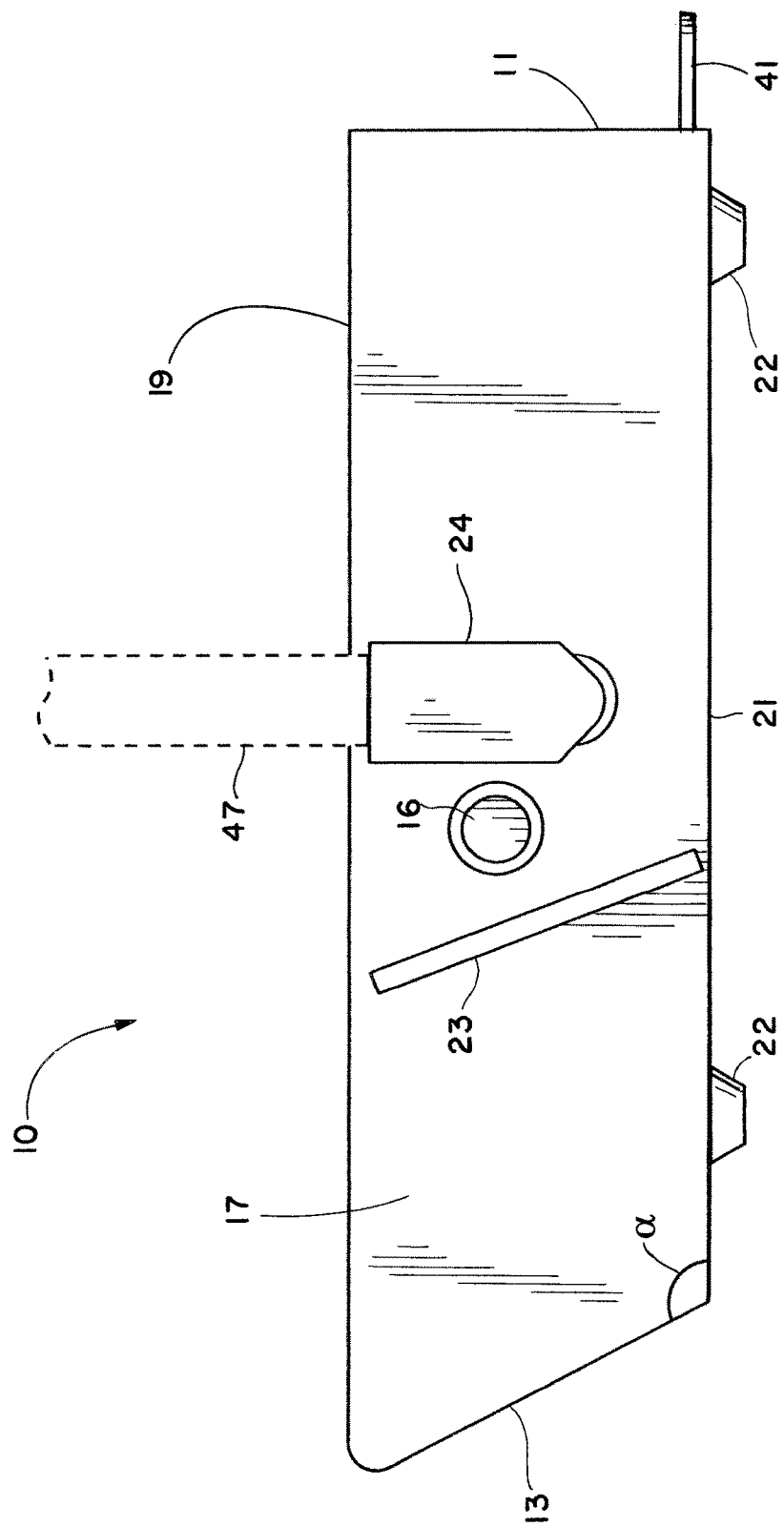
FIG. 3 is a right side view of the control module of FIG. 1, showing a target arm in a raised position.
Figure 8:
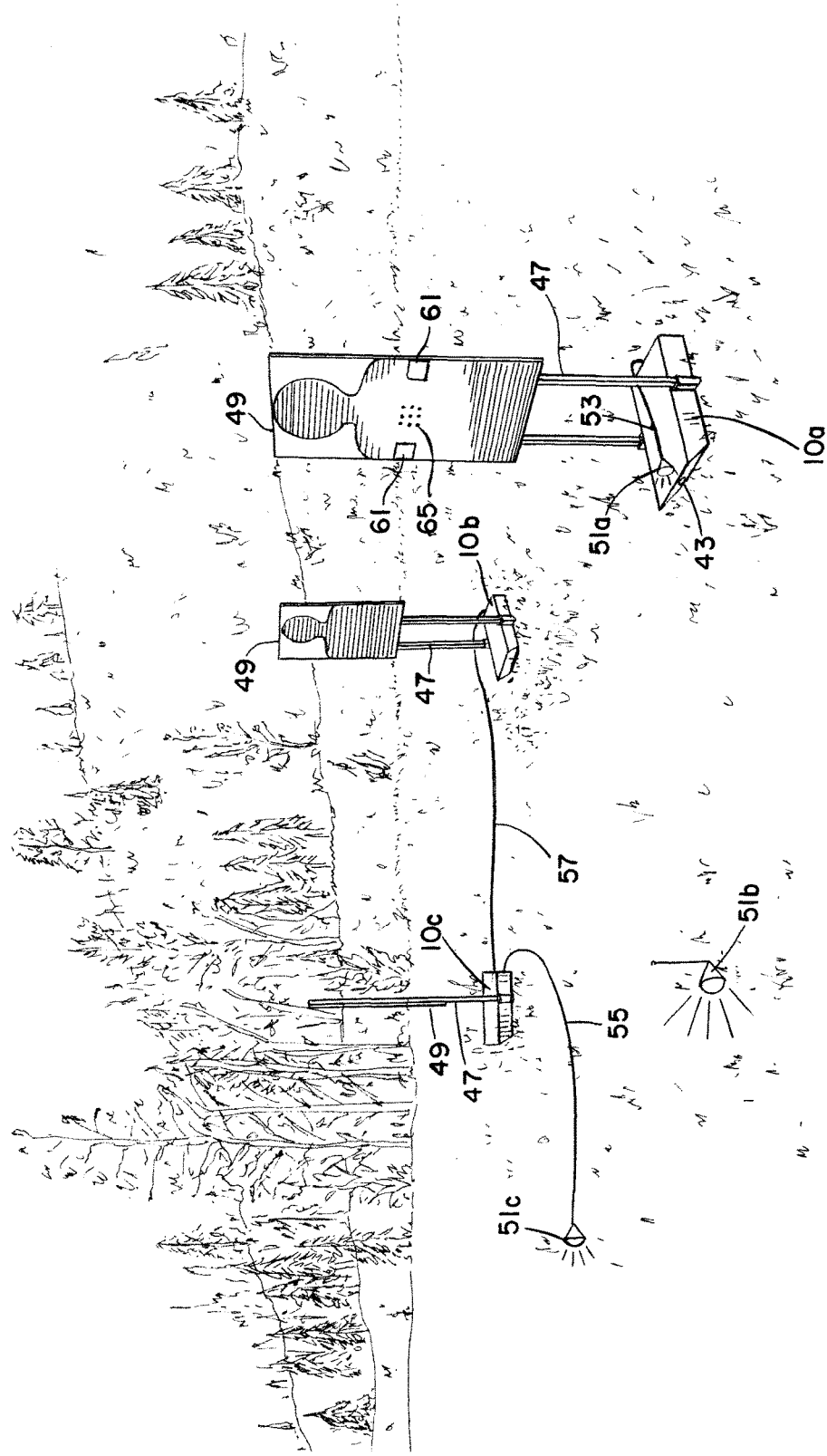
FIG. 8 is a perspective view of a firing range illustrating an exemplary deployment of control modules according to the invention within a system according to the invention arranged to practice methods according to the invention.

In addition to housing the electrical components, the chassis of control module 10 is configured with a safety feature for deflecting an errant shot, or near miss, into the ground. This feature is provided by disposing the front panel 13 at an angle alpha of approximately 120 degrees with respect to the bottom panel 21 (FIG. 3). The chassis also provides one or more protective shields 23, which may each be disposed at a similar angle. Each shield 23 may comprise a generally rectangular plate, preferably composed of the same material as the chassis. Each shield 23 may be attached (e.g. by welding) to a side wall 19 forward of the target arm 24, as shown. Each of the target arms 24 is configured to rotate about a shaft 25 that is coupled to an electric motor 45 housed within the chassis enclosure. Each target arm 24 comprises a hollow shaft 26 (FIG. 5) configured for engaging and supporting the support rods 47 of a target 49 (FIG. 8).

Figure 2:
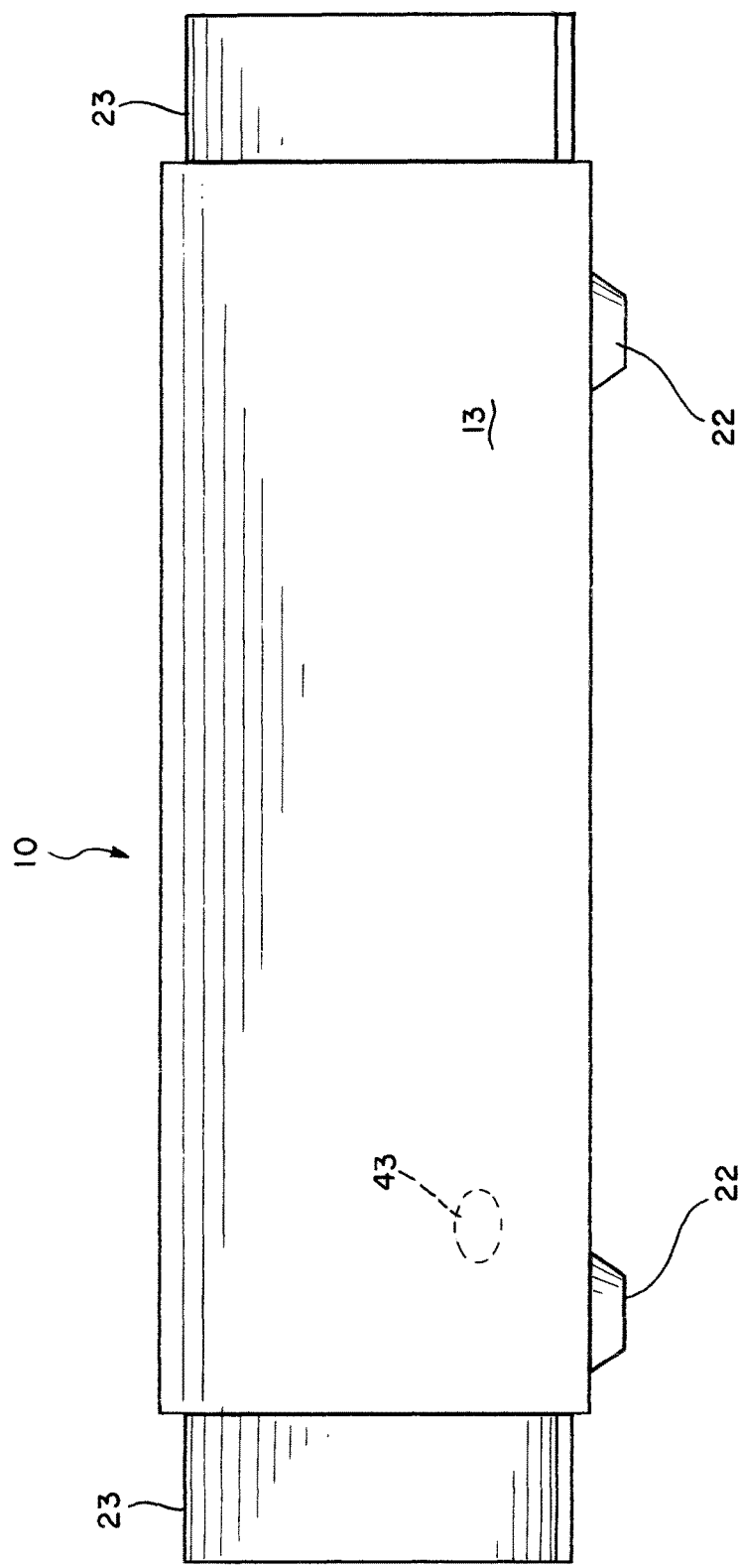
FIG. 2 is a frontal view of the control module of FIG. 1.

FIG. 2 shows a frontal view of the control module 10. Only the protectively angled front panel 13 and the protectively angled shields 23 are visible in this view. Thus, an errant shot striking the control module from a shooter who is facing the target will likely impact one of these angled surfaces and be harmlessly deflected into the ground. In one embodiment of the invention, the control module 10 may include an optional near-miss detector 43 that can be mounted to the inside of the front panel 13, as indicated by the phantom lines. Near-miss detector 43 may comprise a shock sensor, a vibration sensor, an accelerometer, or other instrument capable of outputting a reset signal to the control system described herein, in response to a bullet striking the chassis, the earth, or another obstruction in the near vicinity of the chassis. Near-miss detector 43 may be mounted in any convenient location inside the chassis or on its outer surface. In one embodiment, the near-miss detector 43 is placed on the ground some distance from the chassis, or can be wholly or partially buried under the earth, and coupled to the control module via cabling.

FIG. 3 shows a right side view of the control module 10. This view illustrates a protective shield 23 and target arm 24 mounted to the right panel 15 of the control module chassis. Target arm 24 is shown in a raised position, in which the target 49 is revealed to a shooter. Shield 23 is mounted forward of the target arm, and disposed at an angle similar to the angle alpha between the panel front panel 13 and the lower panel 21. The shield 23 should be sized appropriately so that after mounting, its length is sufficient to protect any part of the target arm 24 from a frontal shot to the chassis. While the exact placement of each of the shield 23 and target arm 24 may vary along the length of the side panel 15, a generally centralized location is preferred, as shown. Such a location allows the electric motor 45 which drives the shaft 25 to be centrally located within the chassis enclosure, and this tends to concentrate the center of mass at the control module center. Such an arrangement better stabilizes the control module for placement in uneven terrain, and in the event of impact from an errant shot.

Figure 4:
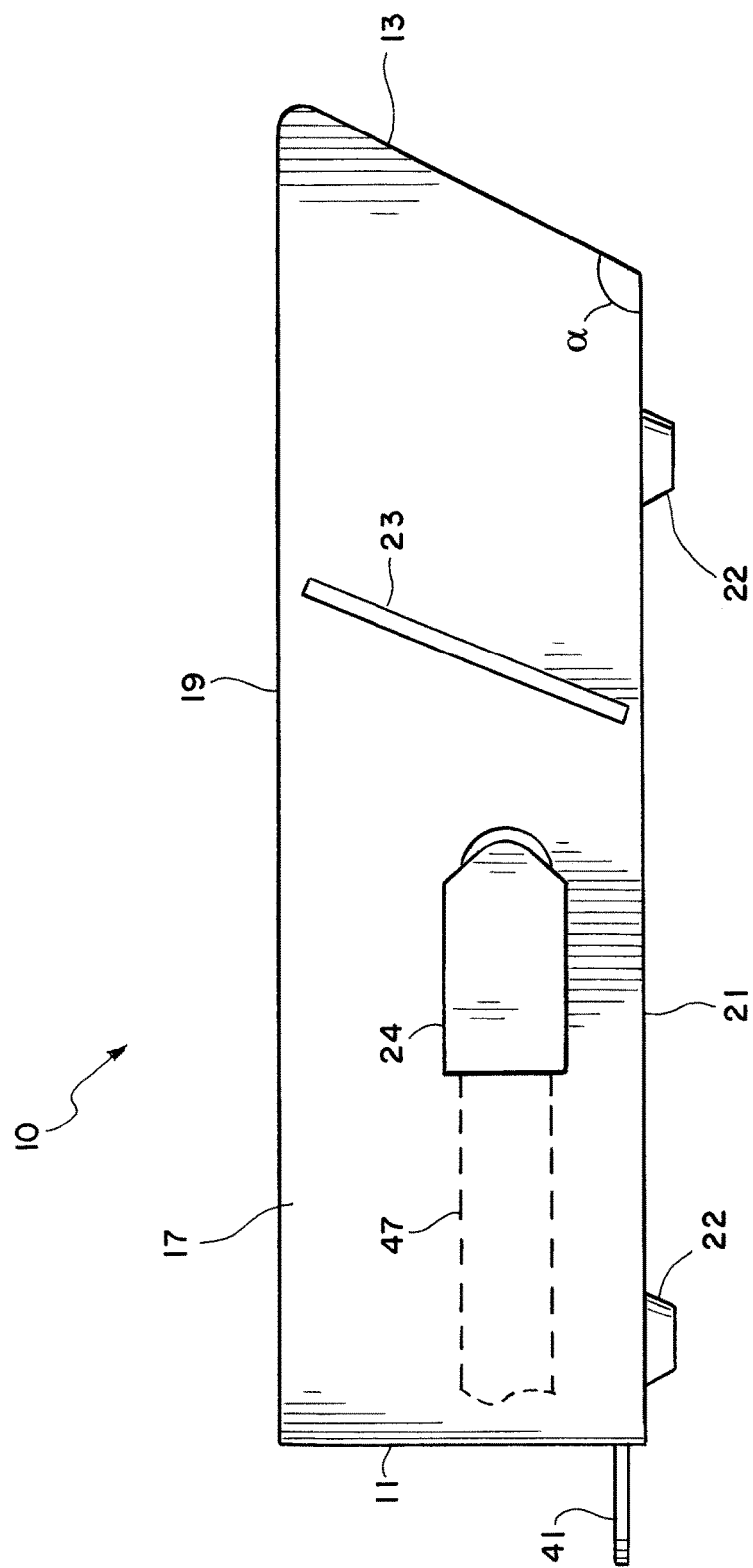
FIG. 4 is a left side view of the control module of FIG. 1, showing a target arm in a lowered position.

FIG. 4 is a left side view of the control module 10. This view illustrates a second protective shield 23, which in this case is mounted to the left panel 17 of the control module chassis, to protect a second target arm 24. In some embodiments, only one target arm is used to reveal and conceal a target 49, in which case the target arm and protective shield can be mounted either on the right panel 15 or the left panel 17. For purposes of illustration only, FIG. 4 shows the second target arm 24 in a lowered position, in which position the attached target 49 is concealed from a shooter. The configuration and operation of the second shield 23 and second target arm 24 are otherwise the same as described for similar components on the opposite panel. When opposing target arms 24 are installed at both the right and left panels, they work cooperatively in tandem to raise and lower the target.

Figure 5:
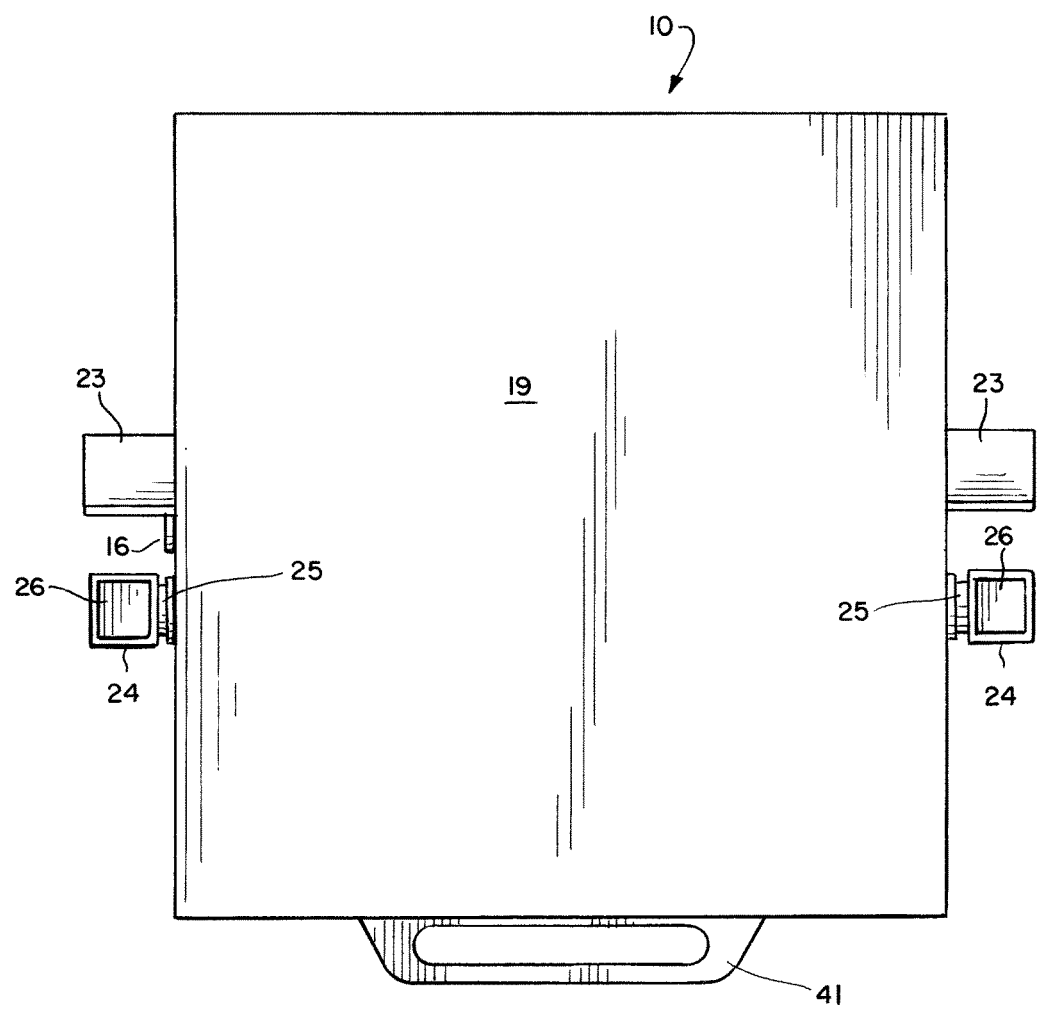
FIG. 5 is a top view of the control module of FIG. 1.
Figure 6:
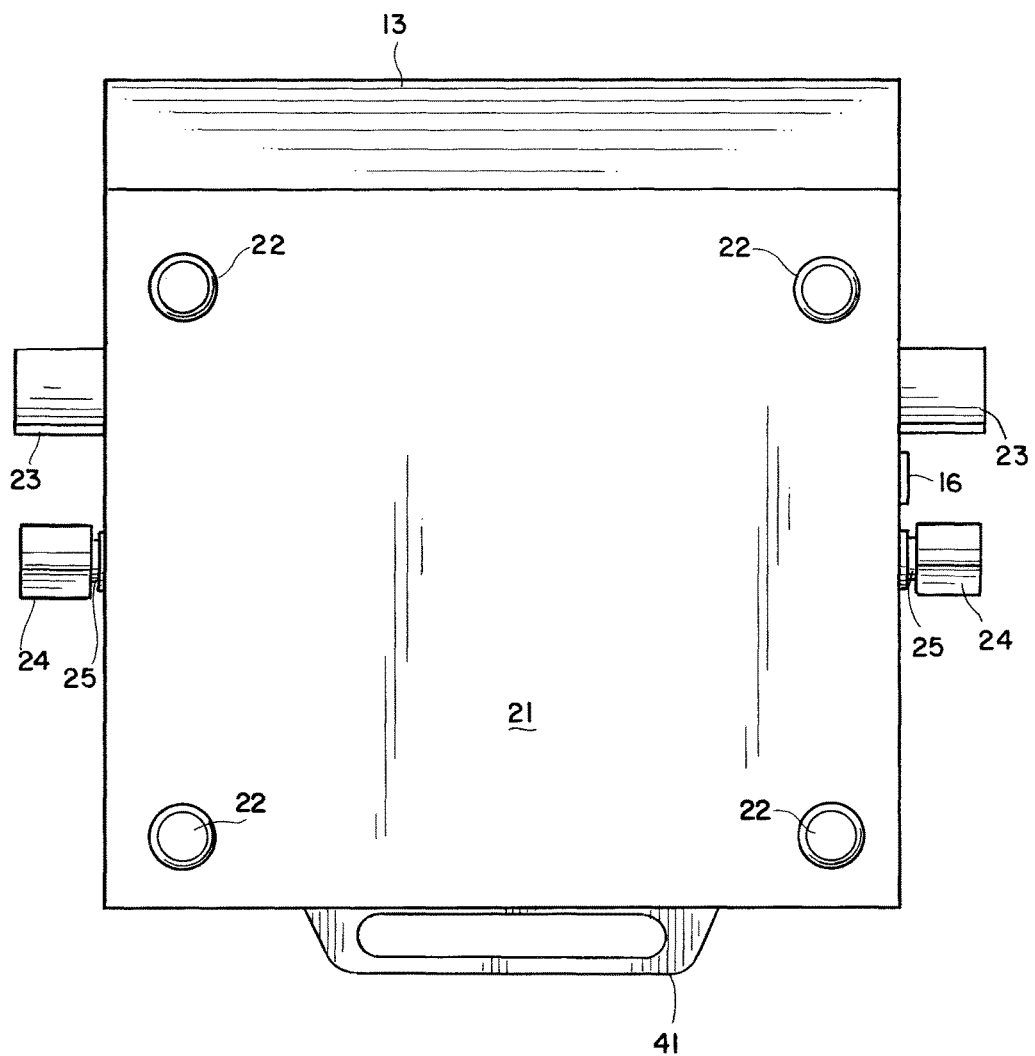
FIG. 6 is a bottom view of the control module of FIG. 1.

FIG. 5 and FIG. 6 are top and bottom views, respectively, of the control module 10. The top view shows the hollow shaft 26 formed into the top of each target arm 24. Though shown in generally rectangular form, the cross-sectional shape of the hollow shaft 26 may be circular or hexagonal or any other configuration suitable for reliably engaging and holding support rods 47 in place throughout the target's span of rotation from the engaged to the concealed position and back again. In some embodiments, fastening hardware such as clevis and cotter pins (not shown) may be used to fasten support rods 47 within the hollow shafts 26. In other embodiments, the components are configured to allow a friction fit to hold the support rods firmly in place. The top and bottom views also illustrate the protective geometry of the chassis. Each protective shield 23 has sufficient width to guard a target arm 24 against errant shots coming from a direction forward of the control module. Front panel 13, due to its downward sloping angle, is visible only from the bottom view.

Figure 7:
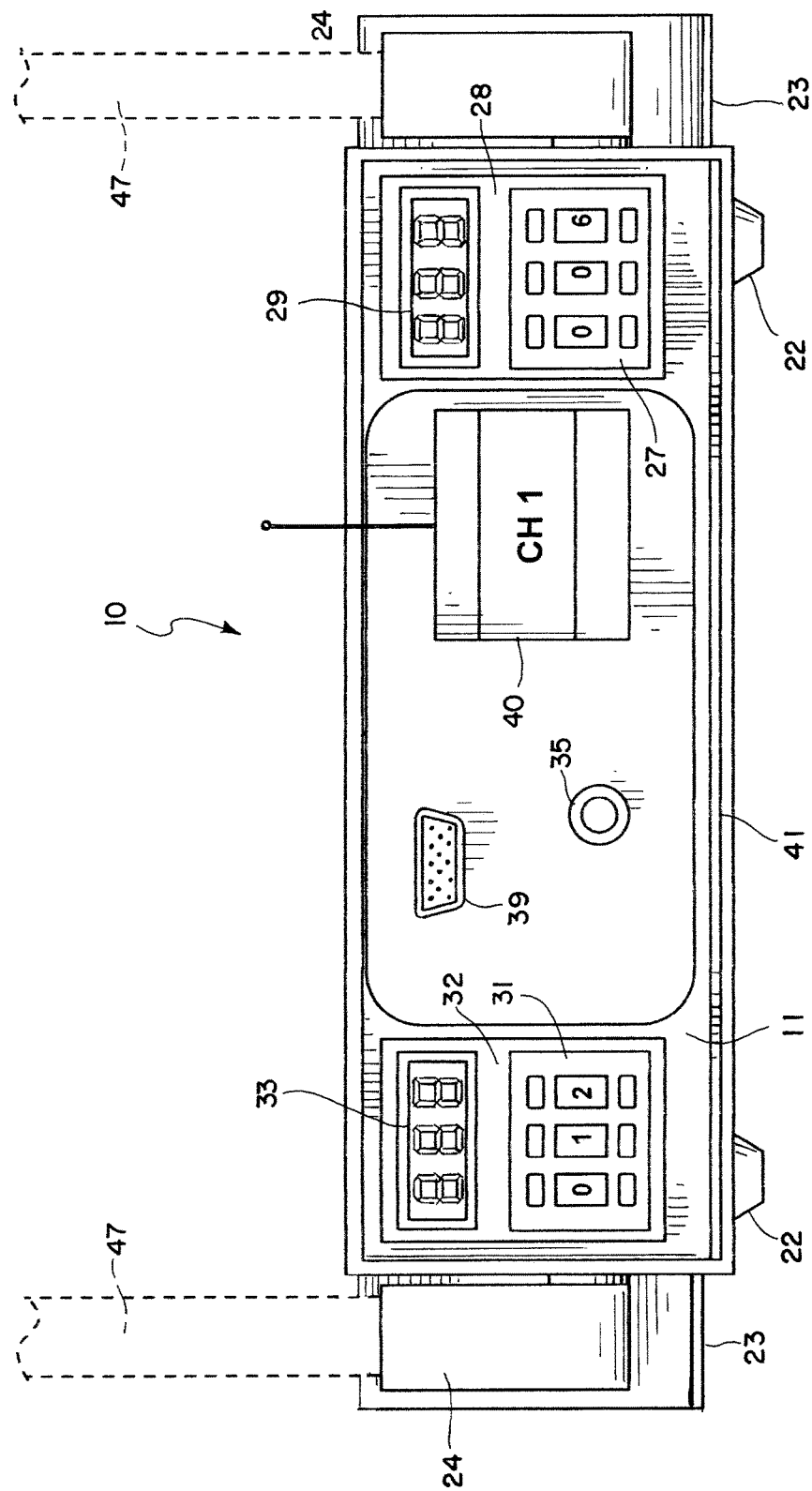
FIG. 7 is a rear view of the control module of FIG. 1, showing a wireless transmitter connected thereto, to enable communication among a plurality of similar control modules.

FIG. 7 shows a rear view of the control module 10. Notable in this view is the presence of an optional wireless switch 40, which is plugged in to the main connector 37, hiding it from view. Wireless switch 40 enables the control module 10 to communicate wirelessly with a remote control or with other control modules. Preferably, the remote control is capable of communicating at a distance of up to 1000 yards with at least eight wireless switches 40 to allow a remote operator to simulate ambush training. In one embodiment, wireless switch 40 comprises a model KL-K103X receiver and the remote control comprises a model KL3000-8 433 MHz transmitter, both made by Shenzhen Kelvin Electronics Co.

According to the invention, multiple control modules 10 each equipped with a wireless switch 40 may form a cooperative system of targets deployed in a combat simulation course, wherein the wireless switches 40 allow any control receiving a trigger signal to relay (or transmit) the trigger signal to one or more other control modules in the system. The same functionality can be achieved using wired connections to the main connector 37; however, the wireless option may be preferable in difficult terrain, or simply to avoid the inconvenience of handling and setting up cable in the field. Whether effected wirelessly or otherwise, the capability to link control modules in this manner facilitates the design or modification of a customized training course in which multiple control modules can cooperate without centralized control.

The delay timer 28 may include an exposure delay adjustor 27 and an exposure delay display 29. The exposure delay adjustor 27 provides manual means for selecting or adjusting a delay time for the target 49. The delay time determines a time delay from receipt of a trigger signal by the control module to movement of the target 49 from a concealed position to a revealed position. The exposure delay display 29 provides a visual readout of time remaining until the delay times out.

The exposure timer 32 may include an exposure duration adjustor 31 and an exposure duration display 33. The exposure duration adjustor 31 provides manual means for selecting or adjusting an exposure time for the target 49. The exposure time determines the amount of time that the target will remain in the revealed position without being hit until being moved back into the concealed position. The exposure duration display 33 provides a visual readout of time remaining until the exposure times out.

The delay timer 28 and exposure timer 32 can be the same make and model timer, or they may be of different construction. In one embodiment, the delay timer 28 and exposure timer 32 are Anly Electronics Co model ASY-3D timers with a 0 to 999 second range and 24 VDC operating voltage.

External power port 35 provides a means for connecting a power cable to the control module 10, either to charge an internal battery or to run the module directly from an external power source. In this exemplary disclosure, the control module 10 operates on 24 VDC, though other operating voltages, DC or AC, are possible within the scope of the invention. External power port 35 may be configured as a socket, for example, to receive a coaxial cable or other multi-conductor plug.

Main connector 37 and link connector 39 each provide an external interface to allow the control module 10 to send and receive control signals, and to provide power to other external components. Connectors 37 and 39 are preferably both multi-pin connectors. Examples of the signals connected through connectors 37 and 39 include remote control signals for concealing or revealing a target, motion sensing or trigger signals that indicate the presence of a human body within a predetermined distance from a target, hit detection signals that indicate a bullet striking the target, near-miss signals that indicate a bullet striking the control module or an obstruction near the control module, reset signals commanding the target to be concealed, and power signals for providing power to external components such as lighting under certain conditions. In one embodiment, one or both of main connector 37 and link connector 39 are 15-pin VGA connectors, as depicted in the exemplary figures. Further operation of the components shown on rear panel 11 and the various control signals are described below in greater detail with reference to the exemplary control circuit 90.

FIG. 8 shows a perspective view of a firing range illustrating an exemplary deployment of control modules that form a target shooting system in outdoor terrain. Each of control modules 10a, 10b, and 10c is equipped with a target 49 installed in its target arms. In addition, motion sensors 51a, 51b, and 51c are placed at strategic locations in the forward vicinity of the targets. Each motion sensor may be connected to one or more of the target control modules by a wireless link or by communication cable. In the exemplary system depicted here, motion sensor 51a is mounted to the top panel of control module 10a, and coupled to the main connector via cable 53. Motion sensor 51b is located on ground and may communicate wirelessly with all three control modules. Motion sensor 51c is located elsewhere on the terrain and is coupled to control module 10c by cable 55. Each of the motion sensors is oriented to detect motion of a human body along a path likely to be traversed by a shooter, and when such motion is detected, to transmit a trigger signal to one or more control modules. For example, motion sensor 51c may be located in front of control module 10c, as shown, and pointing forward to detect the presence of an approaching shooter. Alternatively, any of the motion sensors can be placed on trees, shrubs, rocks, and other structures and oriented to detect human motion approaching a target from any likely direction. A cable 57 installed between the link connectors 39 of control modules 10b and 10c enables communication between the two, for example, to allow one control module to alert the other whenever a trigger signal is received.

Delay settings on a control module may be adjusted according to placement of the motion sensors. For example, if a motion sensor is placed 100 feet from a target and the course designer plans for the control module to autonomously reveal its target when a shooter approaching at about five feet per second is approximately 50 feet from the target, the exposure delay on delay timer 28 can be adjusted to 10 seconds. The control modules may also be equipped with an optional delaying relay 59 that delays transmission of a trigger signal received from a motion sensor when relaying that trigger signal to another control module. Using this feature, target exposures can be staggered among multiple control modules in the system, all in response to a single triggering event, as a shooter moves through the course. Skilled artisans will recognize the versatility provided by the autonomous control modules, which make it possible to customize a target shooting course to achieve a variety of triggering sequences among a plurality of targets when activated by decentralized, autonomous controllers.

A motion sensor 51*a*, 51*b*, or 51*c* may be an optical sensor, a vibration sensor, an acoustic sensor, an infrared sensor, a mechanical trip device, or any other sensor capable of detecting the presence of a human body and transmitting a trigger signal in response. The trigger signal may be a voltage or current signal, a switch opening or closure, transmission of an analog pulse or digital code, etc. The motion sensors are preferably capable of discriminating a human body from other disturbances such as the movement of animals or the detonation of flash grenades. In one embodiment, the motion sensor comprises a passive infrared sensor (PIR) such as those made by Visonic® for use in burglar alarms and automatically activated lighting systems. These sensors can be tuned to detect infrared radiation emitted by a human body, and are not triggered by light, vibration, or acoustics. For such motion sensors, detonation on the firing course of a flash grenade alone averts a trigger signal, as the sensors are immune to the resulting flash and acoustic shock. To discriminate from background radiation, the motion sensor can be configured as a pair of PIR sensors arranged for differential detection.

The target 49 is preferably made of lightweight, consumable material such as paper, cardboard, or soft plastic. Lightweight material is preferred so that it won't deflect shots dangerously back in the direction of a shooter, and because it places a lighter load on the motor 45. Each target 49 may include an image of a human torso or silhouette, depicting either a threat or an innocent bystander. Each target 49 may also include a hit detection sensor 61. The hit detection sensor senses a direct hit on target 49 through vibration or other means, and in response outputs a hit signal to the hit detection module 63, for example, via connection to the main or link connector. The hit signal may be a voltage or current signal, a switch opening or closure, transmission of an analog pulse or digital code, etc. In one embodiment, hit detection sensor 61 comprises a piezoelectric accelerometer.

In another embodiment, hit detection sensor 61 operates as an inductive proximity sensor using known principles for detecting the velocity of copper-jacketed bullets at speeds of around 900 m/s or higher. Such systems operate by detecting a timing difference in the interruption of magnetic flux caused by passage of the bullet through two separate coils displaced by a known distance. A hit detection sensor 61 according to the present invention, however, requires only a single coil or single pair of conductive wires configured to detect an interruption in a magnetic flux induced in the coil, or induced in one wire lying within the magnetic field of a current-carrying wire, due to nearby passage of a copper-jacketed bullet. The momentary interruption in magnetic flux may be detected as a voltage signal that represents a bullet striking the target. Such a hit detection sensor 61 may comprise two or more conductive wires physically displaced from one another in a parallel an orientation creating a gap between any two wires wide enough to pass a large caliber copper-jacketed bullet without impacting any of the wires. The hit detection sensor 61 may be placed onto the target at a location that would indicate a successful hit. In one embodiment, the hit detection sensor may comprise a sheet of plastic film with embedded wires, such as a flex circuit, including sensing circuitry or a means for coupling the wires to the necessary sensing or signal conditioning circuitry.

Each target 49 may also optionally be equipped with one or more pressure-sensitive LEDs or LED arrays 65 configured to illuminate around the area where an incoming round strikes the target. For example, an LED array 65 may be placed at locations on the target 49 that would indicate a lethal hit if struck by a bullet. The LEDs may be provided in the form of a plastic film or flex circuit containing OLED arrays. Power for the LEDs may be provided from the battery 67 or from another source.

Each control module 10*a*, 10*b*, and 10*c* is configured to interface with additional sensing features. For example, control module 10*a* may include one or more near-miss detectors 43 in the form of a shock sensor, a vibration sensor, an accelerometer, or other instrument configured to output a near-miss signal akin to other signals described herein in response to a bullet striking the chassis, the earth, or another obstruction in the near vicinity of the chassis. In the embodiment depicted herein, the near-miss detector 43 is mounted to an inside surface of the front panel 13; however, it may be mounted elsewhere on the control module, on a target arm 24, or on the ground nearby. A control module 10 equipped with optional near-miss detection includes a near-miss detection module 69. The near-miss detection module 69 interfaces with the existing trigger and reset controls in the control module. When a near-miss signal is received, the near-miss detection module 69 in response causes a reset signal to conceal the target 49. Then upon lapse of a predetermined time delay stored in the near-miss control module, the near-miss control module causes a trigger signal to reveal the target 49. This action simulates the behavior of a human target who is spooked by a near miss or who suffers a non-lethal wound such as a glancing shot to the foot or leg. The target momentarily collapses or disappears from sight, then reappears as a threat.

Figure 9:
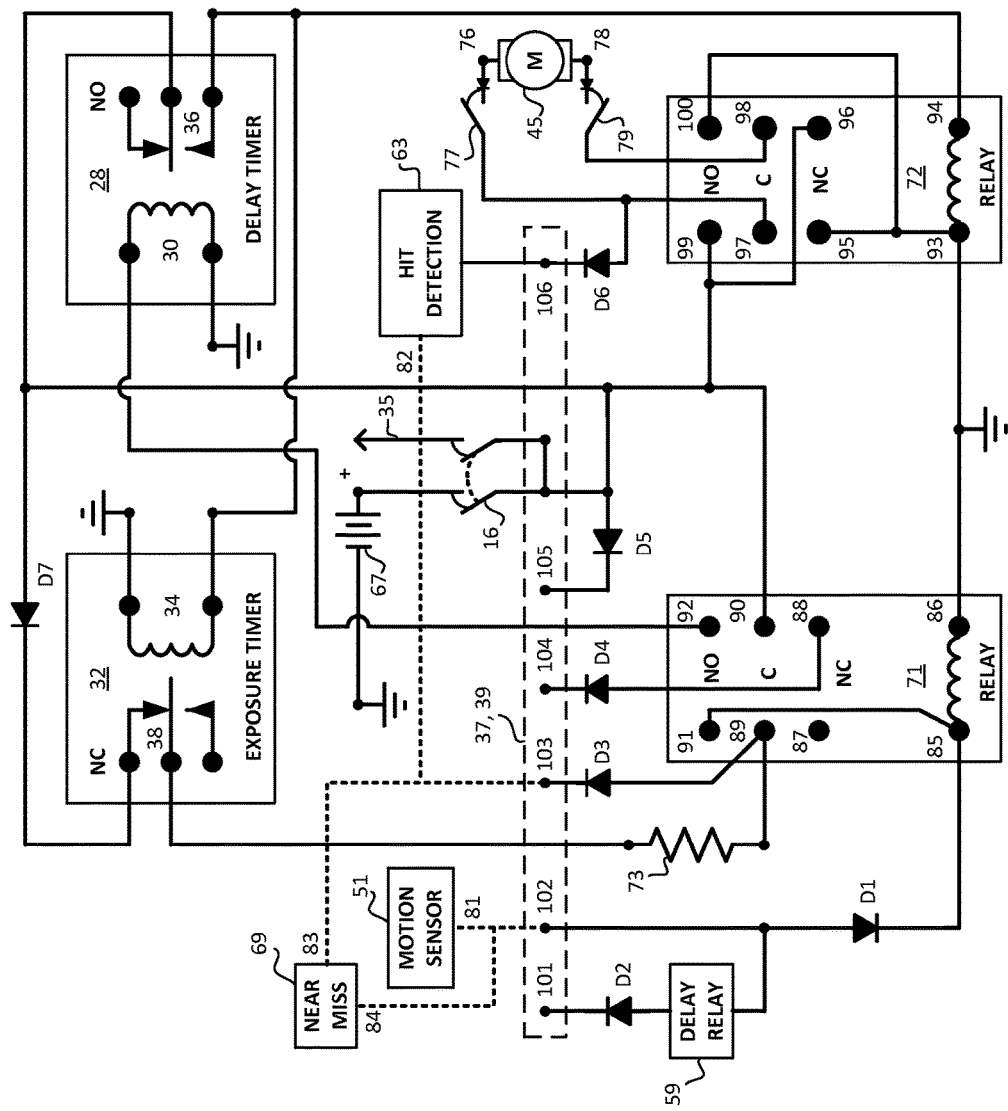
FIG. 9 is a diagram of one embodiment of an electrical control circuit showing interconnections among components of a control module for use in an autonomous target system according to the present invention.

FIG. 9 is a diagram of one embodiment of an electrical control circuit 70 showing interconnections among components of an autonomous control module according to the present invention. Control circuit 70 shows the following components that are enclosed within or mounted to the chassis: power switch 16, delay timer 28, exposure timer 32, power port 35, motor 45, motion sensor module 51, optional delay relay 59, hit detection module 63, battery 67, near-miss module 69, latching relay 71, motor control relay 72, power resistor 73, and motor limit switches 77 and 79. For simplicity, main and link connectors 37 and 39 are modeled as a single bus having multiple nodes 101 through 106. The motion sensor 51, hit detection module 63, and near-miss module are understood to receive detection signals from the field. The external connections are omitted for simplicity. Control signals 81, 82, 83, and 84 transmitted by these components are modeled as dashed lines. Solid lines indicate power connections.

Battery 67 is enclosed within the control module and provides all power required for the control module to operate autonomously. In a preferred embodiment, battery 67 comprises a 24 VDC battery bank rated for 6.8 amp-hours and configured for external charging via external power port 35. Power port 35 may be a 5.5 mm radial plug having compatible power ratings. In one embodiment, battery 67 and power port 35 are configured to allow the battery to charge from a rollable solar charging panel coupled to power port 35. Power switch 16 when closed turns on the control module 10 to place it in a ready condition. In a preferred embodiment, power switch 16 is wired in series with battery 67 such that neither operation of the control circuit 70 nor charging of battery 67 can occur unless the power switch 16 is closed. This may be accomplished using a DPST power switch, wired in the configuration shown.

Latching relay 71 controls the triggering and reset operations for the target 49. Motor control relay 72 controls the voltage polarity cross the terminals of motor 45, to cause the motor to rotate in one direction to reveal the target, or in the opposite direction to conceal the target. In a preferred embodiment, motor 45 is a 24 VDC motor rated to deliver 221 inch-lbs. of torque, and under a target load to rotate through 90 degrees between about 1.0 and 1.1 seconds. Motor 45 is also equipped with limit switches 77 and 79 to limit rotation of the motor to a span of about 90 degrees. Relays 71 and 72 may of similar or different construction. In one embodiment, these relays are identical double pole, double throw (DPDT) relays, Songle model SMI-24VDC-SD-2C with form C contacts rated for 10 amps.

In the ready condition, with relay 72 unenergized, the positive terminal of battery 67 connects to motor terminal 78 through NC contact 96 and C contact 98. Thus, with motor terminal 76 grounded through C contact 97 and NC contact 95, +24V appears across the motor from terminal 78 to terminal 76. This polarity causes motor 45 to rotate target 49 about +90 degrees in the target-concealing direction, or if the target is already concealed, a diode in limit switch 79 disables current flow and the target will remain temporarily locked in the concealed position with +24V across the motor terminals.

In the ready condition, control module 10 awaits a trigger signal 81 at node 102. Trigger signal 81 is a signal that energizes relay 71 across terminals 85 and 86. For example, the trigger signal 81 may be a +24V pulse provided by remote control, or by a sensor such as a motion sensor 51 or near-miss module 69, transmitted directly or through a transducer coupled to node 102. Relay 71 is configured as a latching relay by shorting terminal 85 to NO contact 91, so that a voltage pulse at terminal 85 switches the NO contacts 91 and 92 closed and the NC contacts 87 and 88 open. Terminal 85 is now latched to +24V through NO contacts 91, C contact 89, resistor 73, and NC contact 38 of the exposure timer 32. The latching action maintains relay 71 in this condition until contact 89 is grounded or deenergized to reset the relay. Optional diode D1 may be installed as shown for protecting circuits coupled to node 102 when terminal 85 is energized. Optional diode D3 may be installed as shown to prevent a module coupled to node 103 from energizing the relay 71. The ratings of resistor 73 are selected so that the voltage division from +24V is sufficient to pick up the coil of relay 71, and so that if contact 89 is shorted to ground to effect reset action, the resistor will limit the current draw to prevent an overload condition or tripping a fuse or circuit breaker elsewhere in the circuit. In one embodiment, resistor 73 is a 50-ohm, 5 W power resistor.

The energization of relay 71 at terminal 85 causes NO contact 92 to connect to +24V through C contact 90, which also energizes coil 30 of the delay timer 28. Delay timer 28 then begins to count down its pre-adjusted exposure delay time. When the delay time has lapsed, NO contact 36 closes, completing the circuit through delay timer 28, which simultaneously energizes relay 72 at terminal 94 and the coil 34 of exposure timer 32.

When relay 72 is energized, the voltage polarity across motor terminals 76 and 78 is reversed. In this condition terminal 76 receives +24V through C contact 97 and NO contact 99, while terminal 78 is grounded through C contact 98 and NO contact 100. Motor 45 now rotates the target 49 approximately −90 degrees in the revealing direction until limit switch 77 trips to block current flow to the motor by means of a diode, temporarily locking target 49 in the revealed position with −24V across the motor terminals.

When the coil 34 is energized, the exposure timer 32 then begins to count down its pre-adjusted exposure time duration. When the exposure duration time has lapsed, the NC contact 38 opens, removing power from C contact 89 and NO contact 91, thereby deenergizing the coil of relay 71. When relay 71 drops out, NO contact 91 opens to reset the relay. NO contact 92 also opens, and this disconnects from power from the coil 30 of delay timer 28, restoring NO contact 36 to the open position, which deenergizes exposure timer 32 and relay 72. NC contact 38 of exposure timer 72 returns to the closed position, but cannot pick up relay 71 because NO contact 91 is open. The coil of relay 72 drops out, reversing the state of its contacts, and reversing the voltage polarity at motor terminals 76 and 78 thereby driving the motor in the concealing direction to conceal the target 49 and stop when limit switch 79 trips. The circuit 70 is now reset to the ready condition.

Suppression diode D7 may be placed as shown between NC contact 38 of the exposure timer 32 and the +24V node at NO contact 36 of the delay timer 28. Diode D7 prevents transient voltages (e.g. back-emf) from causing undesirable circuit operation, such as relay oscillation, when relay coils de-energize.

Hit detection module 63 awaits a hit signal from a hit detection sensor 61 that is mounted onto target 49. The hit signal is typically a very low power signal originating from an accelerometer or magnetic induction device, therefore the hit detection module receives and processes the hit signal, as necessary, using known signal processing techniques such as filtration and amplification. The output of the hit detection module is modeled as signal 82 and indicated by a corresponding dashed line, which may represent a current, voltage, or switching signal interfacing with node 103. According to the invention, transmission of a hit detection signal from the hit detection sensor 61 is not effected unless the hit detection module 63 places signal 82 at node 103. For example, signal 82 may represent closure of a switch that grounds node 103. In operation, when a target 49 is in a revealed position, a shooter has an opportunity to shoot the target before the exposure timer 32 times out. If the shooter successfully strikes the target, the hit detection module in response will ground node 103 to deenergize relay 71 and reset the target before the exposure time has lapsed.

Hit detection module 63 receives power through node 106 and the C contact 97 of relay 72. Thus, according to the invention, hit detection module 63 is energized only when relay 72 is energized to connect power to C contact 97 through NO contact 99. Otherwise the hit detection module remains grounded through C contact 97 and NC contact 95. Optional diode D6 may be installed as shown for additional circuit protection when node 106 is grounded. The overall effect is that the hit detection sensor 61 can transmit a hit detection signal 82 responsive to a shot striking the target 49 only when the target is revealed. This prevents false positive hit detections that may occur, for example, if debris or wind or other sources of vibration agitate the hit detection sensor 61 while the target 49 is in a concealed position.

In one embodiment, the hit detection module 63 includes or is coupled to a time delay relay (not shown) that locks out operation of the hit detection module until the target 49 physically stabilizes after being motored into the revealed position. This may be accomplished by placing the contacts of a fixed or adjustable time delay relay in series with the power feed to the hit detection module. For example, a time delay in the range of about 1 to 2 seconds should allow the target 49 to stabilize and prevent shock or vibration caused by movement of the target to set off a false positive hit detection signal.

Near-miss module 69 processes signals received from a near-miss detector 43. Near-miss module 69 may include amplification and filtration circuits similar to those resident in hit detection module 63, for converting or transducing a near-miss signal into a reset signal 83 for compatibility with the ratings of the control circuit. In one embodiment, some or all parts of near-miss module 69, hit detection module 63, and motion sensor module 51 may be incorporated into a common circuit board. In another embodiment, near-miss module 69 may be connected to control circuit 70 in a manner similar to that of hit detection module 63 such that a near-miss detector 43 may only transmit a reset signal 83 when the target 49 is revealed.

Near-miss module 69 includes a time delay circuit, e.g. a relay (not shown) having a near-miss delay that may be pre-set or adjustable similar in operation to timers 28 and 32. In response to receiving a near-miss signal from a near-miss detector 43, near-miss module 69 simultaneously transmits the reset signal 83 and starts counting down the near-miss delay. If preset, the near-miss delay may be set, for example, for a relatively short period of about 4 or 5 seconds. Reset signal 83 has the same effect as hit detection signal 82, to reset relay 71 and cause the target 49 to rotate to the concealed position. When the near-miss delay times out, however, the near-miss module 69 places a trigger signal 84 at node 102. Trigger signal 84 has the same effect as trigger signal 81, to actuate relay 71 and reveal the target 49. The overall effect of the near-miss feature is to simulate human behavior when an errant, inaccurate, or otherwise non-lethal shot strikes a human target or impacts nearby. In such a circumstance, a hostile human target may react by immediately dropping to the ground or ducking for cover, only to reveal himself a few seconds later to open fire at his assailant.

Control circuit 70 may include several additional features that allow it to communicate with, provide power to, or control other components external to the control module. The first of these features is the optional delay relay 59 that is coupled between nodes 101 and 102. Delay relay 59 includes a time delay circuit, as in the near-miss module 69, that may be pre-set or adjustable. In a system according to the invention incorporating multiple mutually communicative control modules 10, such as shown in FIG. 8, one or more nodes 101 may be linked to one or more nodes 101 of other control modules in the system, or to a centralized remote control, through wired or wireless means. The purpose of the delay relay 59 is allow for a time delay to lapse before alerting the other control modules in response to control circuit 70 receiving a trigger signal at node 102.

There are two reasons that a designer may wish to incorporate such a delay. The first reason is to stagger the response times among multiple targets that are deployed along the shooting course. This allows the designer more freedom to simulate a combat scenario by revealing targets at different times as a shooter moves through the course, all in response to the shooter tripping a single motion detector. Using this feature, the designer may create complex patterns for target deployment, in which some targets are revealed simultaneously, while others appear after one or more serial delays, as in a domino effect.

The second reason that a designer may wish to incorporate a delay in delay relay 59 is to provide the shooter with an opportunity to successfully strike a triggered target 49 before the delay relay 59 times out. Delay relay 59 may be powered from a node such as node 106 which is energized only when target 49 is revealed. In this case, a hit detection signal 82 will conceal the target 49 and prevent delay relay 59 from alerting other control modules even though a motion sensor associated with target 49 had been tripped. This action simulates a scenario wherein a hostile target, such as a sentry, can potentially signal for reinforcements to escalate the complexity of a fire fight unless that hostile target is quickly dispatched.

Node 106, which provides power only when target 49 is revealed, may be coupled to multiple pins of the multi-pin connectors 37 and 39 and may provide power to components in addition to delay relay 59. An LED array 65 is an example of one such component.

Another feature provided by control circuit 70 is a power source for ancillary components or accessories that is energized only when the target 49 is concealed. Node 104 is an example of one such power source, which may be coupled to one or more pins of the multi-pin connectors 37 and 39. Node 104 may be used, for example, to provide power to motion sensor 51 so that it cannot trigger relay 71 unless the target 49 is concealed. Optional diode D4 may be installed as shown for circuit protection or to prevent battery 41 when discharged from drawing a charging current through node 104.

Another additional feature provided by control circuit 70 is a power source for ancillary components or accessories that is always energized whenever power switch 16 is switched on. Node 105 is an example of one such power source, which may be coupled to one or more pins of the multi-pin connectors 37 and 39. Node 105 may be used, for example, to provide power to a lighting system or component for illuminating a portion of the shooting course, or to an audio system or component for distracting the shooter with sound. Optional diode D5 may be installed as shown for circuit protection or to prevent battery 41 when discharged from drawing a charging current through node 104.

Figure 10:
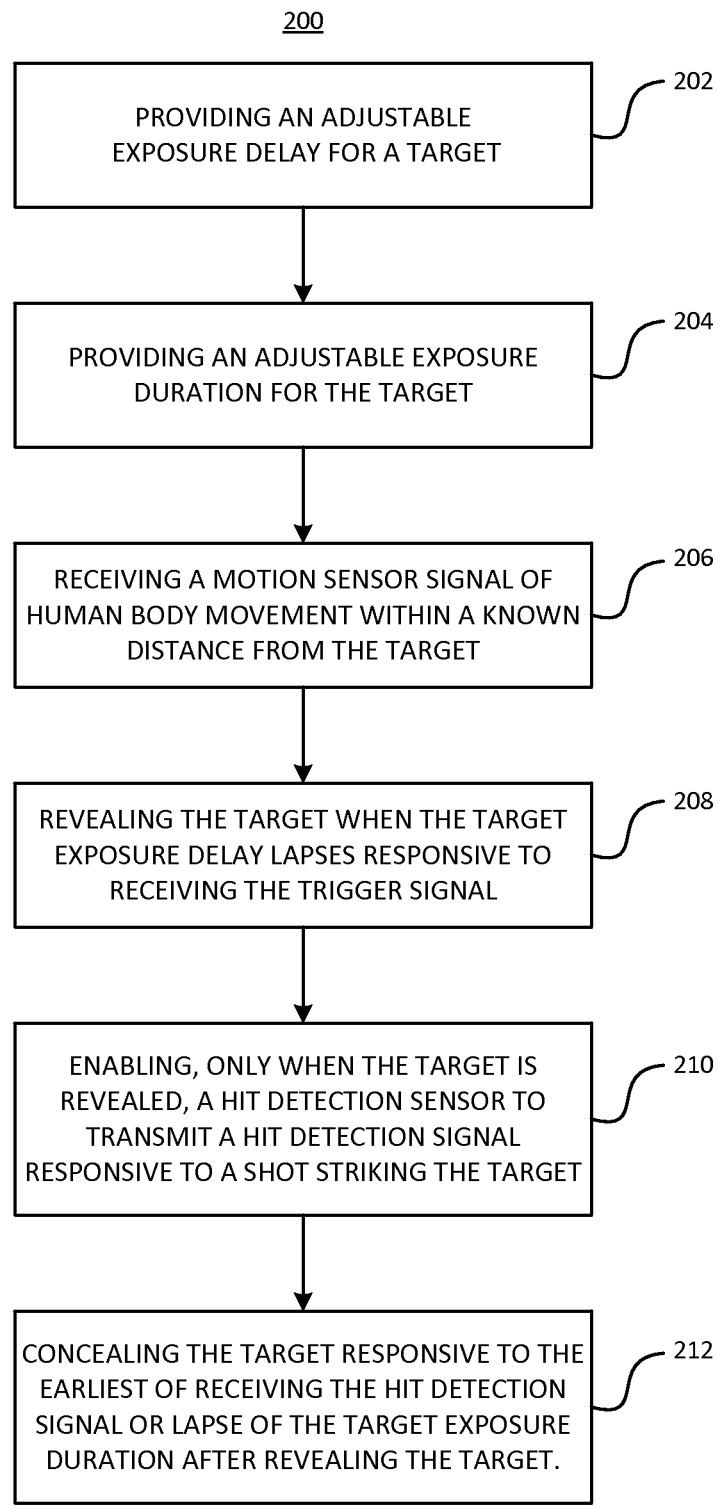
FIG. 10 is a process flow diagram illustrating salient steps in a method according to the invention for autonomous position control of a target deployed in a combat simulation course.

FIG. 10 is a process flow diagram illustrating salient steps in a method 200 according to the invention for autonomous position control of a target deployed in a combat simulation course. The steps of method 200 may be executed from the point of view of the autonomous control module 10, and may reflect steps consistent with the foregoing disclosure describing various operating features of the control module.

The method begins at step 202, which provides an adjustable exposure delay for a target. Providing the adjustable exposure delay means, for example, enabling a capability for selecting a timing setpoint which will determine a time lapse between the point in time when the control module receives a trigger signal to the point in time that the target is revealed to a shooter. The next step is step 204. Step 204 provides an adjustable exposure duration for the target. Providing the adjustable exposure duration for the target means for example, enabling a capability for selecting a timing setpoint which will determine a time span between the point in time when the target is first revealed to a shooter and the point in time that the target will be concealed from the shooter in the absence of receipt of an intervening hit detection signal. In the next step 206, the method receives a motion sensor signal of human body movement within a known distance from the target. This step of the method corresponds to the signal that is transmitted when a shooter traversing the course trips a motion sensor. Physical limitations of a motion sensing device, as well as placement of the motion sensing device, may establish the known distance from the target.

The next step 208 reveals the target when the target exposure delay lapses responsive to receiving the trigger signal. In other words, this step causes the target to move from a concealed position to a revealed position after the motion sensor signal is received in the previous step, and then after the adjustable target exposure delay that was provided in step 202 times out. Then, in step 210, the method enables, only when the target is revealed, a hit detection sensor to transmit a hit detection signal responsive to a shot striking the target. This step means that the hit detection sensor is operationally locked out from affecting any step of the method unless the hit detection sensor senses a hit to the target during a time duration between the execution of steps 208 and 212. The final step 212 comprises concealing the target responsive to the earliest of receiving the hit detection signal or lapse of the target exposure duration after revealing the target. This step causes the target to move from the revealed position back to the concealed position either because the target is hit by the shooter or because the adjustable target exposure duration that was provided in step 204 times out.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A method for autonomous position control of a target deployed in a combat simulation course, comprising the following steps performed by a control module mechanically linked to the target, the method comprising:
    providing an adjustable target exposure delay;
    providing an adjustable target exposure duration;
    receiving from a motion sensor a trigger signal representing movement of a human body within a predetermined distance from the target;
    revealing the target when the target exposure delay lapses responsive to receiving the trigger signal;
    enabling, only when the target is revealed, a hit detection sensor to transmit a hit detection signal responsive to a shot striking the target;
    concealing the target responsive to earliest occurrence of receiving the hit detection signal, lapse of the target exposure duration after revealing the target, or receiving a near-miss detection signal; and
    revealing the target at a predetermined time after receiving the near-miss signal.

2. The method of claim 1 wherein one or both of the adjustable target exposure delay and the adjustable target exposure duration are locally manually adjustable.

3. The method of claim 1 wherein the target comprises one target within a cooperative system of targets deployed in the combat simulation course, further comprising relaying the trigger signal to one or more other targets within the cooperative system.

4. The method of claim 3 further comprising relaying the trigger signal after a predetermined time delay.

5. The method of claim 4 further comprising relaying the trigger signal only when the target is revealed.

6. The method of claim 1 further comprising distinguishing, by the motion sensor, detonation of a stun grenade from the movement of a human body, so that the detonation alone averts the trigger signal.

7. A target control module configured to autonomously position a target deployed in a combat simulation course, comprising:
    means for providing an adjustable target exposure delay;
    means for providing an adjustable target exposure duration;
    means for receiving from a motion sensor a trigger signal representing movement of a human body within a predetermined distance from the target;
    means for revealing the target when the target exposure delay lapses responsive to receiving the trigger signal, or at a predetermined time after a near-miss signal is received;
    means for enabling, only when the target is revealed, a hit detection circuit to transmit a hit detection signal responsive to a shot striking the target; and
    means for concealing the target responsive to earliest occurrence of the target control module receiving the hit detection signal, lapse of the target exposure duration after the target control module reveals the target, or receiving the near-miss signal.

8. The target control module of claim 7 wherein one or both of the means for providing the adjustable target exposure delay and the means for providing the adjustable target exposure duration comprise local manually adjustable means.

9. The target control module of claim 7 further comprising means for relaying the trigger signal to one or more other target control modules within a cooperative system of target control modules deployed in the combat simulation course.

10. The target control module of claim 9 further comprising means for relaying the trigger signal after a predetermined time delay.

11. The target control module of claim 10 further comprising means for relaying the trigger signal only when the target is revealed.

12. The target control module of claim 7 further comprising means for deflecting a shot toward ground.

13. A system of autonomously positionable targets deployed in a combat simulation course, comprising:
    at least one target control module mechanically linked to one of the targets, the target control module comprising:
        an adjustable delay timer defining a target exposure delay;
        an adjustable duration timer defining a target exposure duration;
        a triggering input configured to receive a trigger signal representing movement of a human body within a predetermined distance from the target;
        a hit detection circuit configured to enable, only when the target is revealed, a hit detection sensor to transmit a hit detection signal responsive to a shot striking the target; and
        one or more rotatable arms engaging the target and configured to reveal the target when the target exposure delay lapses responsive to receiving the trigger signal or at a predetermined time after a near-miss signal is received, and to conceal the target responsive to earliest occurrence of receiving the hit detection signal, lapse of the target exposure duration after revealing the target, or receiving a near-miss signal;
    at least one motion sensor coupled to the triggering input; and
    means for linking the triggering input to another target control module.

14. The system of claim 13 wherein one or both of the adjustable delay timer and the adjustable duration timer comprise local manually adjustable timers.

15. The system of claim 13 wherein the linking means comprises a relay configured to transmit the trigger signal to another target control module after a predetermined time delay only when the target is revealed.

16. The system of claim 13 wherein the at least one target control module comprises a bullet-proof chassis enclosing the adjustable delay timer and the adjustable duration timer, the chassis having at least one side angled to deflect a shot toward ground.

17. The system of claim 13 wherein the at least one target control module includes a chassis that includes angled shielding adjacent to the one or more rotatable arms and configured to deflect a shot toward ground.

\* \* \* \* \*